United States Patent [19]

Wilkinson et al.

[11] Patent Number: 4,605,953
[45] Date of Patent: Aug. 12, 1986

[54] DIGITAL PAL COLOR TELEVISION SIGNAL DEMODULATORS

[75] Inventors: James H. Wilkinson; David M. Creed, both of Basingstoke

[73] Assignee: Sony Corporation, Tokyo, Japan

[21] Appl. No.: 575,756

[22] Filed: Feb. 1, 1984

[30] Foreign Application Priority Data

Feb. 4, 1983 [GB] United Kingdom ................ 8303068

[51] Int. Cl.$^4$ ........................ H04N 9/65; H04N 9/66; H04N 11/18
[52] U.S. Cl. ........................................ 358/24; 358/14
[58] Field of Search ........................ 358/24, 14, 18, 23, 358/13, 40, 11, 16, 310; 364/718, 721

[56] References Cited

U.S. PATENT DOCUMENTS 4,349,833 9/1982 Clarke .................................. 358/23

OTHER PUBLICATIONS

"Digital PAL Decoding Using Line—Locked Sampling", C. K. P. Clarke, Brighton Conference: International Broadcasting Convention (Sep. 20-23, 1980), pp. 199-202.

*Primary Examiner*—James J. Groody
*Assistant Examiner*—Michael P. Dunnam
*Attorney, Agent, or Firm*—Lewis H. Eslinger; Alvin Sinderbrand

[57] ABSTRACT

A digital PAL color television signal demodulator for demodulating the U and V color component signals from an input chrominance signal derived from a PAL color television signal which has been digitized by being sampled a predetermined number of times per horizontal line comprises a first memory storing values representing the phases of the sub-carrier signal, on which the U and V color component signals have been modulated, at the first sample position of each of the successive lines of four fields of the television signal, a second memory storing values representing the relative phases of successive sample positions along a horizontal line, means for deriving from the memories values representing the phases of successive sample positions of each of the successive samples in eight fields of the television signal, means to derive from the values derived from the memories quadrature amplitude values of the sub-carrier in synchronism with a sample frequency of the input chrominance signal, and multipliers and low-pass filters for demodulating the input chrominance signal with each of the quadrature amplitude values of the sub-carriers and for deriving the U and V color component signals.

8 Claims, 2 Drawing Figures

DIGITAL PAL COLOR TELEVISION SIGNAL DEMODULATORS

BACKGROUND OF THE INVENTION

1. Field of the Invention

This invention relates to digital PAL color television signal demodulators.

2. Description of the Prior Art

The PAL color television system uses suppressed carrier amplitude modulation by the U and V color components of quadrature sub-carriers. In a digital PAL color television system in which the analog composite video signal has been sampled, for example at the CCIR recommended frequency of 13.5 MHz, and the resulting samples have been coded prior to transmission or recording, it is necessary on reception or reproduction to regenerate the quadrature sub-carriers in order to demodulate the color components. Since the sampling is done at a regular frequency which is locked to the line frequency, it would in theory be possible to regenerate the quadrature sub-carrier waveforms by storing in a programmable read only memory (PROM) the phase values of the quadrature sub-carrier waveforms corresponding respectively to each sample position in the eight-field cycle over which the quadrature sub-carrier waveforms repeat. However, this would require a very large PROM because of the large number of phase values that would require to be stored.

The basic problem is to regenerate sub-carrier waveforms based on a line locked sample rate which, due to the frequencies used in the PAL color television system, has no easy mathematical relationship to the original subcarrier.

SUMMARY OF THE INVENTION

One object of the present invention is to provide an improved demodulator for digital PAL color television signals.

Another object of the present invention is to provide a digital PAL color television signal demodulator in which the phases of the sub-carrier for the first sample positions in the line and the relative phases for the remaining sample positions are stored.

According to the present invention there is provided a digital PAL color television signal demodulator for demodulating the U and V color component signals from an input chrominance signal derived from a PAL color television signal which has been digitized by being sampled a predetermined number of times per horizontal line, the demodulator comprising:

a first memory storing values representing the phases of the sub-carrier signal, on which said U and V color component signals have been modulated, at the first sample position of each of the successive lines of four fields of said television signal;

a second memory storing values representing the relative phases of successive sample positions along a horizontal line;

means to derive from said first and second memories values representing the phases of successive sample positions of each of the successive samples in eight fields of said television signal;

means to derive from said values derived from said first and second memories quadrature amplitude values of said sub-carrier in synchronism with the sample frequency of said input chrominance signal; and means to demodulate said input chrominance signal with each of said quadrature amplitude values of said sub-carrier to derive said U and V color component signals.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
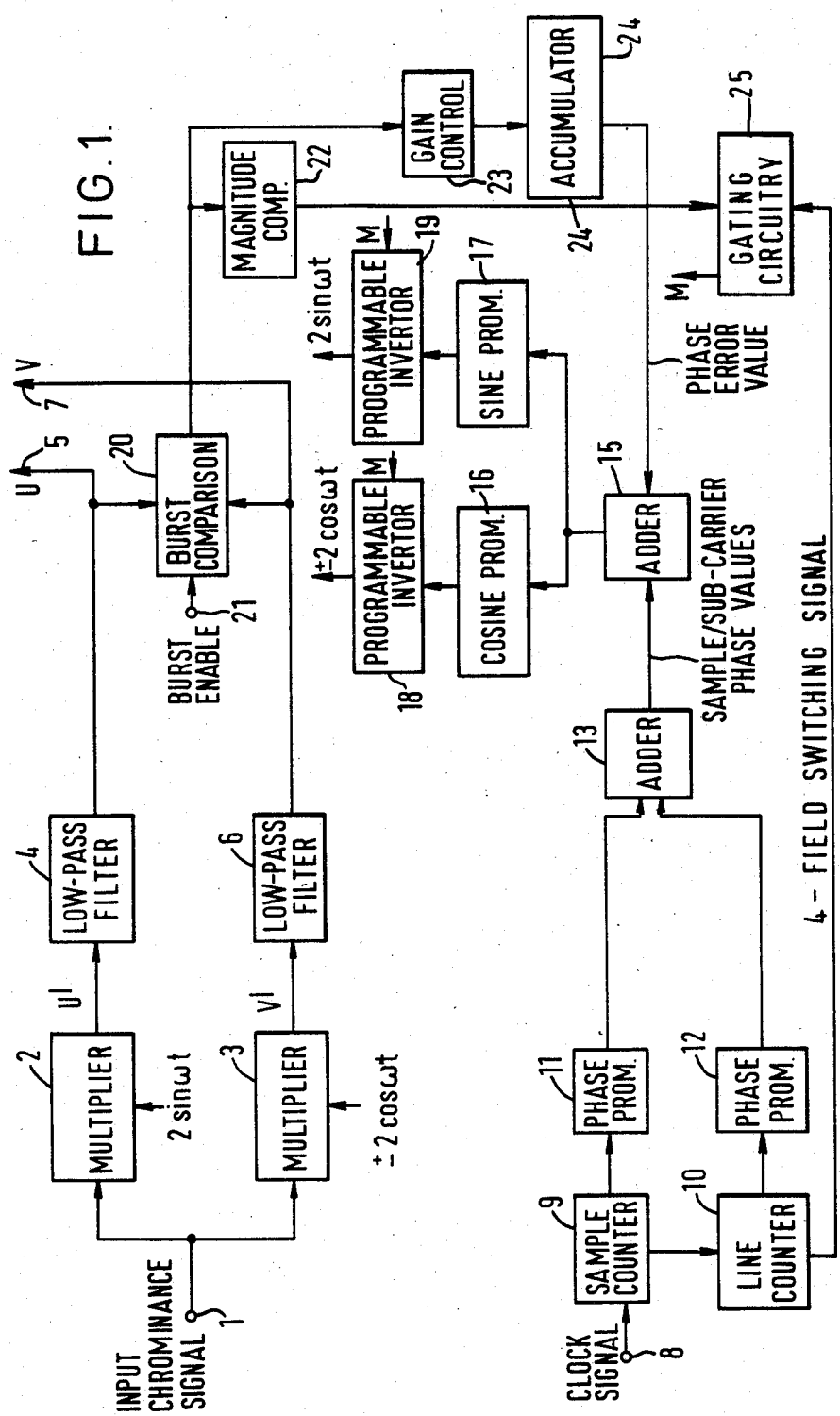
FIG. 1 shows in block form an embodiment of digital PAL color television signal demodulator according to the invention.

The theory underlying the operation of the demodulator to be described will first be discussed. As mentioned above, the PAL color television system uses suppressed carrier amplitude modulation of quadrature sub-carriers on which the U and V color component signals are respectively modulated. The resulting composite modulated signal C(t) can be represented mathematically as a function of time by the expression:

$$C(t) = U(t) \sin \omega t \pm V(t) \cos \omega t \qquad (1)$$

where:
 U(t) and V(t) respectively represent the modulating weighted color difference signals U and V expressed as a function of time, $\omega = 2\pi f_{sc}$, and
 $f_{sc}$ is the sub-carrier frequency.
The sign of the V color component alternates on a line-to-line basis.

The color information in the composite signal C(t) can be demodulated by multiplying the composite signal C(t) by appropriately phased sub-carrier waveforms. Multiplication by 2 sin ωt gives:

$$U(t) - U(t) \cos 2\omega t \pm V(t) \sin 2\omega t \pm V(t) \sin 2\omega t \qquad (2)$$

which after low-pass filtering gives the color component U(t). Similarly, multiplication by ±2 cos ωt gives:

$$V(t) \pm U(t) \sin 2\omega t \pm V(t) \cos 2\omega t \qquad (3)$$

which after low-pass filtering gives the color componet V(t).

The demodulator to be described is particularly concerned with regenerating accurately-phased demodulating waveforms 2 sin ωt and 2 cos ωt in the case of a digital PAL color television system in which the analog composite video signal has been sampled, and the resulting samples have been coded prior to transmission or recording, for example on a video tape recorder. It is then necessary on reception or reproduction from the video tape recorder to regenerate the quadrature sub-carriers in order to demodulate the color components, and in such a digital system this regeneration has to be done making use of the sampling frequency. Thus the sampling is done at a regular frequency which is locked to the line frequency, and hence because the sampling frequency is locked to the line frequency it contains the information necessary to regenerate the subcarrier waveforms with phases appropriate to each sample position.

Normally, a specific relationship holds between the sampling period and the sub-carrier period, and in a particular example this is given by:

$$\frac{ts}{tsc} = \frac{709379}{2500n} \quad (4)$$

where:
ts is the sampling period,
tsc is the sub-carrier period, and
n is equal to the number of samples per horizontal line scan which in
this example is 864.

Thus, in this particular example:

$$\frac{ts}{tsc} = \frac{709379}{2160000} \quad (5)$$

In other words, each sample period corresponds to a phase advance or relative phase value of:

$$709379/2160000 \text{ th's} \quad (6)$$

of the sub-carrier period.

In the demodulator to be described this phase advance is achieved by a sample counter addressing a phase PROM which contains phase values of the sub-carrier based on the above ratio. At the end of each line, a line counter will address another phase PROM which contains the new start phase value for the next line, and the sample counter will then increment this phase value by the given ratio to produce a sequence of phase values which are successively added to the start phase value for the line consisting of 864 samples. These start phase values invert over a four-field period, and in consequence in a 625-line system the line counter need only count 1250 lines with inversion being effected every four fields.

As described, this will result in production of the sub-carrier phase values in accordance with the above specific relationship (6) along each horizontal line and the appropriate phase values at the start of each horizontal line of the eight field cycle. However, there remains the problem of phase errors occurring in the chrominance paths. To remove these phase discrepancies it is necessary to add a phase correction to bring the demodulating sub-carrier waveforms back to the correct relationship with the incoming sub-carrier. This is achieved by examination of the demodulated burst signal in the back porch of the input chrominance signal.

On demodulation, the burst signal after low-pass filtering will result in a dc component. In consequence, both the U and V channels will produce dc values corresponding to the demodulated burst signal. If there were no phase error present then these values in the U and V channels would be equal and in consequence subtraction of one value from the other would result in a zero signal indicating zero phase error. However, errors in the phase of demodulation will produce unequal dc components in the U and V channels respectively, and consequently the non-zero signal resulting from the subtraction will indicate a phase error. The gated demodulated burst signal consist of about thirty samples, that is to say ten cycles of the sub-carrier waveform, and if the results of the subtraction are accumulated over say twenty-four samples and added to the phase value produced by the sample and line counts, then gradually the demodulation sub-carrier waveforms will pull into the correct phase relationship with the incoming sub-carrier.

There remains the possibility of ambiguity introduced by the burst comparison circuitry if the phase of demodulation is incorrect by 180°. In this case, equal U and V dc burst components will be produced, which will apparently indicate that the phase relationship is correct, but in fact the demodulation will be occurring in the wrong quadrant. This can, however, be resolved by examining the signs of the U and V color components. If this is incorrect then the 180° error can be corrected by inverting both the regenerated sub-carrier waveforms.

If successive lines n and n+1 are considered it will be seen that subtraction will result in a zero signal indicating zero phase error when the phase of the demodulation is incorrect by 180°, but if alternatively the dc components in the U and V channels are added then a positive output will be obtained, whereas a negative output will be obtained if the phase of the demodulation is incorrect by 180°.

As an alternative, the Bruch 4-field blanking sequence, in which the first burst in the sequence always has positive V phase, can be used to set the V phase correctly.

The first embodiment of PAL color television digital signal demodulator will now be described in detail with reference to the FIG. 1. The demodulator has an input 1 to which the input chrominance signal is supplied after reception or reproduction from a video tape recorder. The input chrominance signal is supplied from the input 1 to first and second multipliers 2 and 3. To the multiplier 2 is also supplied the demodulating sub-carrier waveform 2 sin ωt of frequency fsc. To the multiplier 3 is also supplied the demodulating sub-carrier waveform ±2 cos ωt of frequency fsc. The demodulated color component U' from the multiplier 2 is supplied by way of a low-pass filter 4 which derives the output color component signal U and supplies it to an output 5. The demodulated color component V' from the multiplier 3 is supplied by way of a low-pass filter 6 which derives the output color component signal V and supplies it to an output 7.

To an input 8 is supplied a clock signal at the sampling frequency derived from and locked to the sampling frequency of the input chrominance signal. In the particular example given above of a 625-line system in which each line is sampled 864 times and there are fifty fields per second, the frequency of this clock signal is 13.5 MHz. The clock signal is supplied to a sample counter 9 which counts to 864, that being the number of samples in a line, and then resets. On resetting, the sample counter 9 supplies an output to a line counter 10 which counts to 1250, that being the number of lines in four fields. Respective outputs from the sample counter 9 and the line counter 10 address phase PROMs 11 and 12, the phase PROMs 11 and 12 each supplying a binary output to a modulo-2 adder 13.

The adder 13 supplies an output to a further modulo-2 adder 15, which supplies an output to both a cosine PROM 16 and a sine PROM 17. The output of the cosine PROM 16 is supplied by way of a programmable inverter 18 to the multiplier 3, while the output of the sine PROM 17 is supplied by way of a programmable inverter 19 to the multipler 2.

Additionally, the outputs of the low-pass filters 4 and 6 are both connected to a burst comparison circuit 20 to which a burst enable signal derived from the input chrominance signal and in synchronism with the burst signal therein is supplied by way of a terminal 21. The output of the burst comparison circuit 20 is supplied to a magnitude comparator 22, and also by way of a gain control amplifier 23 to an accumulator 24, and thence to the adder 15. The magnitude comparator 22 supplies an output to gating circuitry 25, which also receives an input in the form of a four-field switching signal from the line counter 10. The gating circuitry 25 supplies an output M to the programmable inverters 18 and 19.

The operation of the demodulator is as follows. On reception or reproduction from the video tape recorder the digital television signal is subjected to error correction as required, the digital samples are digital-to-analog converted, and the input chrominance signal is derived and supplied to the input 1. The clock signal is also derived in dependence on the digital television signal and is supplied to the terminal 8.

The line counter 10 addresses the phase PROM 12 in synchronism with the start of each horizontal line scan and in dependence thereon the phase PROM 12 supplies respective start phase values in the form of binary numbers representing the phase of the sub-carrier waveform at the start of each of the 1250 lines in four fields. These values then repeat in the next four fields. Meanwhile the sample counter 9 counts the clock signal and addresses the phase PROM 11 in synchronism with each sample along each line. In response, the phase PROM 11 supplies pulse advance values in the form of binary numbers each representing successive values corresponding to expression (6) above, these advance values being added to the start values in the adder 13. The resulting phase values are supplied by way of the adder 15 to the cosine and sine PROMs 16 and 17 which generate the sub-carrier waveforms $\pm 2 \cos \omega t$ and $2 \sin \omega t$ respectively for supply to the multipliers 3 and 2 respectively. From the resulting demodulated color component signals U′ and V′, the low-pass filters 4 and 6 derive the output color component signals U and V respectively for supply to the output terminals 5 and 7.

Additionally, these color component signals U and V are supplied to the burst comparison circuit 20 where the burst signals are extracted by the burst enable signal supplied to the terminal 21. The burst signal corresponding to each of the color component signals U and V will each appear as a dc component due to the action of low-pass filters 4 and 6. Subtraction of one dc component from the other and accumulation of the result by the accumulator 24 over say twenty-four of the thirty samples in the burst signal provides an indication of any phase error of the regenerated sub-carrier waveforms relative to the incoming sub-carrier, and to correct this a phase error value is added by the adder 15 to the phase value supplied by the adder 13. Since the demodulated burst components are dc values, they can be negative or positive numbers in 2's complement arithmetic. Subtraction (or indeed addition as mentioned above) of these components will yield specific values relating to any phase error present in the chrominance path. The subtraction or addition operation is done in the burst comparison circuit 20. Since the gated burst signal comprises approximately twenty-four samples at 13.5 MHz, accumulation is applied over this number yielding a net error, and this accumulation will gradually over many lines act to bring the demodulation waveforms into the correct phase relative to the incoming chrominance signal.

Finally, to ensure that demodulation is not incorrect by 180°, which would still result in equal U and V dc burst components, even although the demodulation was then occurring in the wrong quadrant, the signs of the U and V components are examined by the magnitude comparator 22. If the signs are different, then the programmable inverters 18 and 19 are controlled by the gating circuitry 25 to invert both the regenerated sub-carrier waveforms. In other words, if no phase errors as such are present but the demodulation waveforms are 180° antiphase relative to the incoming chrominance then equal values of demodulated U and V will result. This is the condition for correct phase, but the signals of the U and V components have unique values for correct demodulation. If therefore no phase error is indicated but the signs of the U and V components are incorrect, this forms an indication that demoduation is occuring in antiphase. Mathematically this condition can be rectified by inverting the demodulation components.

Figure 2:
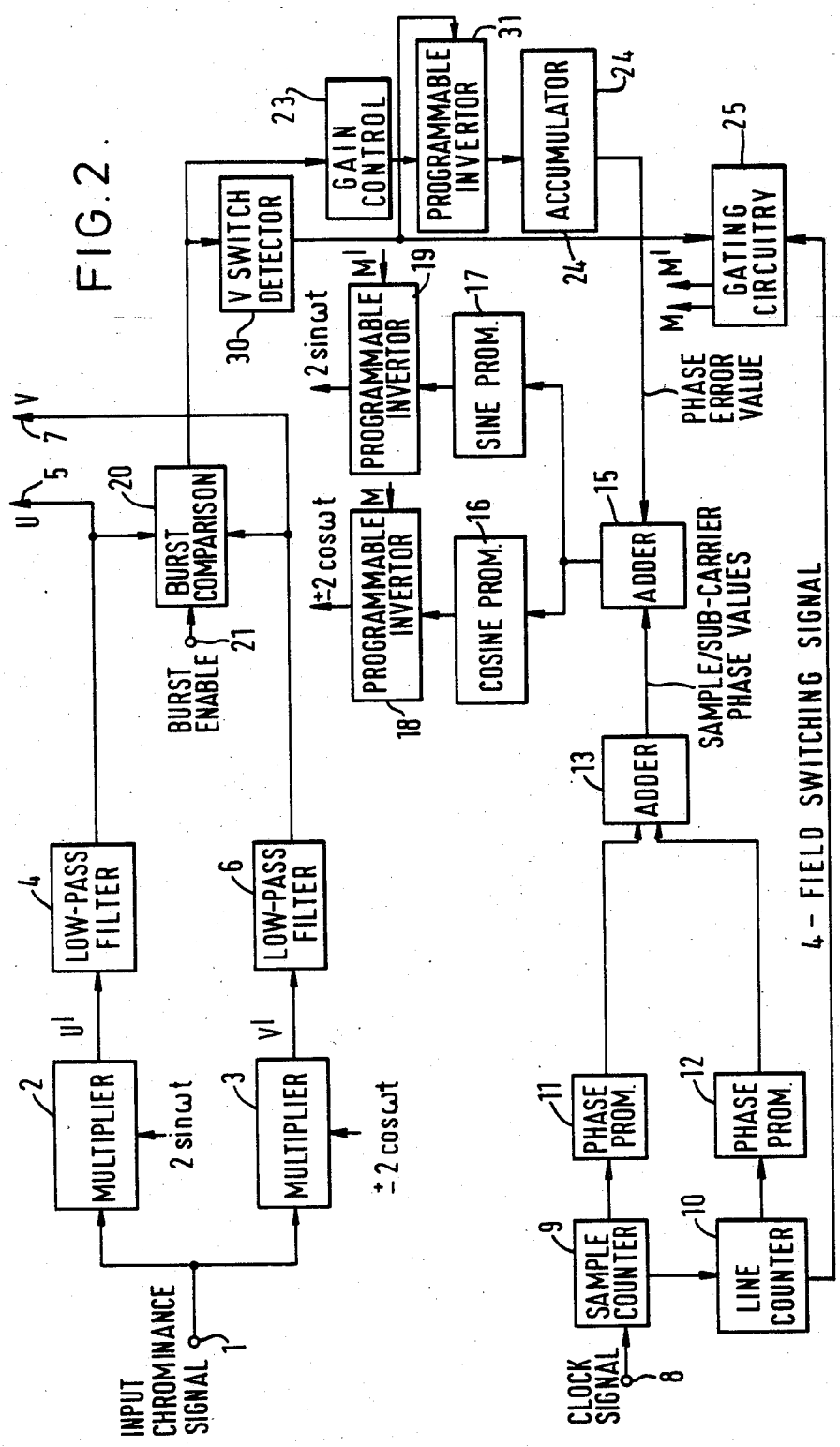
FIG. 2 shows in block form a modified embodiment of digital PAL color television signal demodulator according to the invention.

The second embodiment of PAL color television digital signal demodulator will now be described with reference to FIG. 2. Parts which are similar to parts in the first embodiment shown in FIG. 1 have the same reference numerals and the form and operation of the second embodiment will only be described insofar as they differ from FIG. 1.

In the second embodiment the output of the burst comparison circuit 20 is supplied to a V switch detection circuit 30, and to the gain control amplifier 23. The V switch signal derived by the V switch detection circuit 30 is supplied to the gating circuitry 25, and also to a programmable inverter 31, the output of which is connected to the accumulator 24. The gating circuitry 25 also receives the four-field switching signal from the line counter 10 and supplies outputs M and M′ to the programmable inverters 18 and 19 respectively.

The operation is as follows. In this embodiment the properties of Bruch blanking are utilized. Essentially a framing signal is created to cover the burst period of line six only in the field blanking area. Due to incorporation of Bruch blanking in the PAL system certain lines in the field blanking area have no burst waveform. In particular an examination of the field blanking interval over the PAL eight field sequence will show that burst are present on line six in the field blanking region on frames 2 and 4 and absent on frames 1 and 3. This property is used in the V switch detection circuit 30 by examining the demodulated U and V burst waveform on line six to detect the absence of the burst signal. Although the detection of absence of burst signal on this line indicates either frame 1 or 3, this can be used to start the V switch signal in the correct phase and from this point due to an odd number of lines per frame this signal will stay in synchronism with the input chrominance throughout, allowing demodulating waveforms to be presented in the correct phase. This regenerated V switch signal is then used to control the signal of burst error accumulation in the accumulator 24 via the programmable inverter 31, and of course the phase of demodulating waveforms in the same manner. The four-field switching signal is used to ensure that only four fields of sampling/subcarrier phase values need be stored since after four fields the sub-carrier phase undergoes a 180° phase change.

It will be appreciated that various other modifications can be made to the above-described embodiments without departing from the scope of the appendant claims. For example, in a practical arrangement it will generally be necessary to add compensating delays to the signal paths in the demodulator, but for simplicity these have not been shown or described. Moreover, it is to be understood that the particular field frequency, lines per frame and samples per line mentioned above are given merely by way of example and that other values may be chosen as appropriate.

Although illustrative embodiments of the invention have been described in detail herein with reference to the accompanying drawings, it is to be understood that the invention is not limited to those precise embodiments, and that various changes and modifications can be effected therein by one skilled in the art departing from the scope and spirit of the invention as defined by the appended claims.

We claim:

1. Apparatus for demodulating U and V color component signals from an input chrominance signal of a digital PAL color television signal which was derived from an analog PAL color television signal occurring in successive fields each formed of a plurality of successive horizontal lines and having said U and V color component signals modulated on a sub-carrier signal thereof, said digital television signal being derived by sampling said analog television signal at a sample frequency yielding a predetermined number of samples per horizontal line at corresponding sample positions such that said sub-carrier signal has a predetermined phase at each said sample position, said apparatus comprising:
   first memory means for storing first values representing the phases of the sub-carrier signal at a first sample position of each of the successive lines of four successive fields of said analog television signal;
   second memory means for storing second values representing relative phases of said sub-carrier signal at successive sample positions along a horizontal line relative to the phase at the first sample position thereof;
   means to derive from said first and second values stored in said first and second memory means third values representing the phases at successive sample positions of each of the successive samples of said sub-carrier signal in eight successive fields of said analog television signal;
   means to derive from said third values first and second quadrature amplitude values of said sub-carrier signal in synchronism with the sample frequency of said input chrominance signal; and
   means to demodulate said input chrominance signal with each of said quadrature amplitude values of said sub-carrier signal to derive said U and V color component signals.

2. Apparatus according to claim 1, wherein said means to demodulate said input chrominance signal includes first and second low-pass filter means, and first and second multiplying means respectively supplied with said first and second quadrature amplitude values of said sub-carrier signal and having first and second outputs, respectively, said input chrominance signal being supplied to said first and second multiplying means, the outputs of said first and second multiplying means being supplied to said first and second low-pass filter means, respectively, said U and V color component signals being respectively derived as outputs thereof.

3. Apparatus according to claim 2, wherein said means to demodulate said input chrominance signal further includes burst comparison circuit means receiving said U and V color component signals supplied by said low-pass filter means for comparison of magnitudes of dc components resulting from burst signals in said U and V color component signals, and providing a phase error value supplied to said means to derive said third values which is added to said third values to correct for a phase error relative to the sub-carrier signal of said input chrominance signal.

4. Apparatus according to claim 3, wherein said burst comparison circuit means includes means for comparing signs of said dc components resulting from said burst signals in said U and V color component signals to check that demodulation is occurring in a correct quadrant, and means for generating an inversion signal if the demodulation is found to be in an incorrect quadrant, said means to derive first and second quadrature values being responsive to said inversion signal to invert each of said quadrature amplitude values of said sub-carrier signal.

5. Apparatus according to claim 1, wherein said means to derive first and second quadrature amplitude values includes third and fourth memory means, and adder means to which said third values are supplied, an output of said adder means addressing said third and fourth memory means to respectively produce said first and second quadrature amplitude values of said sub-carrier signal.

6. Apparatus according to claim 1, further comprising counter means clocked at said sample frequency, and wherein said second memory means is addressed by an output of said counter means.

7. Apparatus according to claim 6, further comprising second counter means clocked by a pulse output of the first-mentioned counter means, and wherein said first memory means is addressed by an output of said second counter means produced at a horizontal line frequency.

8. Apparatus according to claim 1, wherein each of said first and second memory means is a programmable read only memory.

* * * * *